(12) United States Patent
Sander (10) Patent No.: US 7,217,395 B2
(45) Date of Patent: May 15, 2007

(54) PIEZOELECTRICALLY CONTROLLABLE MICROFLUID ACTOR SYSTEM

(75) Inventor: Dietmar Sander, Geesthacht (DE)

(73) Assignee: Eppendorf AG, Hamburg (DE)

( * ) Notice: Subject to any disclaimer, the term of this patent is extended or adjusted under 35 U.S.C. 154(b) by 522 days.

(21) Appl. No.: 10/349,775

(22) Filed: Jan. 23, 2003

(65) Prior Publication Data

US 2003/0143122 A1    Jul. 31, 2003

(30) Foreign Application Priority Data

Jan. 26, 2002  (DE)  .............................. 102 02 996

(51) Int. Cl.
*B01L 3/02*  (2006.01)
(52) U.S. Cl. .................... 422/100; 347/68; 347/71; 347/72; 347/48
(58) Field of Classification Search ......... 422/99–100; 347/27, 68, 70–72, 44–48, 54; 417/540
See application file for complete search history.

(56) References Cited

U.S. PATENT DOCUMENTS

| | | | |
|---|---|---|---|
| 5,161,774 A | 11/1992 | Engelsdorf et al. | |
| 5,271,431 A | 12/1993 | Mettner et al. | |
| 5,927,335 A | 7/1999 | Christensen | |
| 6,131,879 A | 10/2000 | Kluge et al. | |
| 6,227,824 B1 | 5/2001 | Stehr | |
| 6,267,146 B1 | 7/2001 | Miyazoe et al. | |
| 6,361,154 B1* | 3/2002 | Watanabe et al. | ............. 347/70 |
| 6,656,432 B1* | 12/2003 | Hirota et al. | ............... 422/100 |
| 6,744,177 B2* | 6/2004 | Riedel et al. | ............... 310/332 |
| 6,814,937 B1* | 11/2004 | Hirota et al. | ............... 422/100 |
| 6,875,402 B2* | 4/2005 | Hirota et al. | ............... 422/100 |
| 6,945,637 B2* | 9/2005 | Okubo | ...................... 347/70 |
| 2002/0009374 A1 | 1/2002 | Higashino | |
| 2003/0142173 A1* | 7/2003 | Takahashi | ..................... 347/68 |
| 2003/0227519 A1* | 12/2003 | Ikeda et al. | ..................... 347/68 |
| 2004/0001120 A1* | 1/2004 | Murai | ......................... 347/68 |
| 2005/0018021 A1* | 1/2005 | Koike et al. | ..................... 347/68 |
| 2005/0030351 A1* | 2/2005 | Sugahara et al. | ............. 347/71 |
| 2005/0174395 A1* | 8/2005 | Mita et al. | ..................... 347/72 |

FOREIGN PATENT DOCUMENTS

| | | |
|---|---|---|
| DE | 8426774 | 12/1984 |
| EP | 0134614 | 3/1985 |

OTHER PUBLICATIONS

Patent Abstract of Japan JP-60118915 Jun. 1985.
Chakraborty, et al., MEMS micro-valve . . . , Sensors & Actuators 83 (2000), pp. 188-193.
Dr. Stefan Fischer-Fruhholz, Dar Labor auf dem Chip (Laboratory on a Chip), Biotec Jan. 1997, pp. 40-44.
Brochure of a company Gesim Gesellschaft "Multi-Dose Steuergerat" (control unit), Apr. 1999.

* cited by examiner

*Primary Examiner*—Brian R. Gordon
(74) *Attorney, Agent, or Firm*—Abelman, Frayne & Schwab (57) ABSTRACT

A piezoelectrically controllable microfluid actor system, comprising a planar substrate which has at least one cavity on at least one side and has at least one passage which has an aperture in the cavity, and at least one diaphragm which has its border mounted on one side of the substrate so as to span the cavity, which has at least two superposed and interconnected diaphragm layers of which at least one is an electrically controllable piezoceramic element, and which is adapted to be deflected into the cavity by means of an electric drive.

26 Claims, 5 Drawing Sheets

PIEZOELECTRICALLY CONTROLLABLE MICROFLUID ACTOR SYSTEM

BACKGROUND OF THE INVENTION

1. Field of the Invention

The invention relates to a piezoelectrically controllable microfluid actor system.

2. Description of the Prior Art

EP 1 150 105 A2 has made known gas-cushioned micro-proportioning systems for proportioning liquid volumes in the microlitre and sub-microlitre ranges. Such systems have a liquid reservoir with a storage space for the liquid to be proportioned, the borderline of which is broken through by an outwardly leading liquid passage and a gas passage. They further have a gas displacement system with a micropump for pumping a gas, and a communication with the gas passage. In addition, they have a proportioning control in an active communication with the micro-pump to produce a negative pressure or positive pressure by actuating the micro-pump and applying the negative pressure or positive pressure to the liquid reservoir to receive a liquid in the storage space through the liquid passage or to deliver it therefrom.

Microvalves and micropumps are required to implement such an aircushioned micropipette. The microvalves and micropumps currently available involve relatively great expenditure and, hence, are costly and not particularly suited for an economical use in a series product.

EP 0 134 614 A1 has made known a micropump which comprises at least two valves and at least one displacement chamber wherein the valves and the displacement chamber are piezoelectrically controllable.

The valves and displacement chamber are of the same shape and are connected in series in a duct and can be functionally controlled so as to achieve a peristaltic displacement of the fluid to be pumped through the duct.

The valves and the displacement chamber comprise a silicon chip including channels which are worked in and to the flat upper side of which a glass plate is firmly adhered which, in turn, carries a piezoelectric chip. If a voltage is applied to the piezoelectric chip the glass plate may be bulged away from the silicon chip so as to assume a wave shape in cross-section. As a result, a passage closed by the glass plate will be opened between various channels in the silicon chip, thus making the element passable.

When in a non-deflected condition, the glass plate flatly rests on the silicon chip except for the areas located over the orifices of the channels. Since the piezoceramic element and the underlying support area of the silicon chip are of a similar size the planar compression and, hence, the tightness of the channel blocking devices is relatively low. Moreover, in this arrangement, the glass plate allows to be deflected comparatively little from the silicon chip by controlling the piezoceramic element as compared to undergoing a deflection towards the silicon chip which, however, is impossible in this construction in a non-deflected condition. Also, a consequence of the wave-shaped deflection is that only a very narrow passage is released between the channels.

The production of such microchips requires a large manufacturing expenditure as is common in the semiconductor technology because of a multiplicity of different production steps. Add to this that the substrate materials, specifically silicon, are relatively costly although it is a mass production article.

Accordingly, it is the object of the invention to provide piezoelectrically controllable microfluid actor system (hereinafter also referred to as a "microfluid actor system") which can be manufactured at a relatively low expenditure and features an improved diaphragm operation.

SUMMARY OF THE INVENTION

The object of the invention is achieved by providing a piezoelectrically controllable microfluid actor system having:
- a planar substrate which has at least one cavity on at least one side and has at least one passage which has an aperture in the cavity, and
- at least one diaphragm which has its border mounted on one side of the substrate so as to span the cavity, which has at least two superposed and interconnected diaphragm layers of which at least one is an electrically controllable piezoceramic element, and which is adapted to be deflected into the cavity by means of an electric drive.

The object of the invention is further achieved by a piezoelectrically controllable microfluid actor system having the following features:
- a planar substrate which has at least one circumferential projecting support area on at least one side and has at least one passage which has an aperture in the support area, and
- at least one diaphragm which has its border mounted on one side of the substrate so as to span an aperture of at least one passage, which has at least two superposed and interconnected diaphragm layers of which at least one is an electrically controllable piezoceramic element, and which is adapted to be deflected by means of an electric drive in its centre until bearing on the projecting support area or away from its bearing position on the projecting support area and/or has its border mounted on the projecting support area.

The object of the invention is further achieved by a piezoelectrically controllable microfluid actor system having:
- a planar substrate which has at least one passage including at least one aperture on at least one side of the substrate, and
- at least one diaphragm which has its border resiliently mounted on one side of the substrate so as to span the aperture of at least one passage, and which has at least two superposed and interconnected diaphragm layers of which at least one is an electrically controllable piezoceramic element.

In all solutions, the diaphragm comprises two diaphragm layers of which at least one is electrically controllable, i.e. is mechanically active. This diaphragm layer is a piezoceramic element. It is preferred to control it electrically such as to make it contract in the diaphragm plane. Its contraction comes about because the piezoceramic element maintains its volume and, when acted on by an external, electrically equidirectional field, will be polarized in a direction normal to the diaphragm plane and, therefore, will be expanded. The piezoceramic element has fixedly connected thereto a further diaphragm layer which has dimensions similar to that of the piezoceramic element, but is not necessarily controllable electrically, or is passive. Preferably, the further diaphragm layer is also a piezoceramic element. This reduces the influence of temperature on the operation of the diaphragm. The contraction alone of the active diaphragm layer results in the entire diaphragm being bulged similarly to a bimetal which is deformed by a change in temperature.

If the passive diaphragm layer is disposed on one side of the substrate and the active diaphragm layer is disposed on the opposed side thereof the diaphragm will be deflected towards the substrate when a voltage equidirectional to the polarization voltage is applied. Although an oppositely directed voltage causes an opposite deflection it will be substantially lower because the voltage level has to be chosen merely to be substantially lower with a view to maintaining the piezomechanical characteristics.

If the active diaphragm layer is disposed on one side of the substrate and the passive diaphragm layer is disposed at the opposed side thereof the diaphragm will be deflected away from the substrate when a voltage equidirectional to the polarization voltage is applied. This arrangement is of a comparatively lower dynamics in time, but can have advantages again when in the non-deflected condition because of the negligible dead space which is included. Such an arrangement may also cause a deflection of the diaphragm towards the substrate because of an opposite direction of voltage.

If two electrically controllable diaphragm layers are disposed, the simultaneous application to the two active diaphragm layers of a unidirectional voltage and an oppositely directed voltage which is correspondingly lowers the deflection may be slightly increased as compared to a composite diaphragm having an active and a passive diaphragm layer.

The deflection of the diaphragm may cause the closure or release of the passage aperture or a volume displacement of a fluid through the passage to realize a micro-diaphragm valve or micro-diaphragm pump.

In the first system, the diaphragm is deflected towards the substrate into a cavity which exists there. There, the diaphragm may close an aperture or cause a volume displacement by reducing the size of the cavity. The cavity allows to achieve a beneficial deflection of the diaphragm towards the substrate for the first time.

The deflection of the diaphragm helps achieve a particularly high planar compression and, hence, a particularly good seal in the sealing area. Moreover, when the diaphragm bulges out the result is a reduced surface of contact with the substrate and an increased planar compression in the sealing area.

It is particularly advantageous to design the cavity in the shape of a trough. The trough can be adapted, at least partially, to the shape of the deflected diaphragm, which allows to avoid an infavorable dead space. Since the diaphragm is preferably of a circular design the bulge which forms is approximately of a bell shape when the diaphragm is locked at its border. When the diaphragm is resiliently locked at its border the circular diaphragm will be bulged into an approximate calotte-shell shape. The trough has a matching shape. If the diaphragm is to close an aperture the shape of the trough preferably departs from the shape of the deflected diaphragm at a sealing area near the aperture so that the diaphragm comes to bear thereon at an increased planar compression.

According to an aspect, the cavity is a depression in the surface of the planar substrate. Then, the diaphragm is mounted at the border on the side of the planar substrate.

More aspects of the sealing area and cavity are incorporated into the second system.

With this system, according to the first alternative solution, the substrate has a circumferential projecting support area which comprises the aperture and against which the diaphragm is adapted to bear or from which the diaphragm is adapted to be deflected. An increased planar compression and, thus, an improved sealing effect is achieved in this support area.

According to an aspect, the diaphragm is mounted on the substrate so that the diaphragm, when in a non-deflected condition, bears its centre against the projecting support area at a slight bias, which causes an increased planar compression. When in the non-deflected condition, the diaphragm will then have a slight bulge. The diaphragm, when acted on by a control voltage, will be deflected away from the substrate so as to release the aperture. However, in the non-deflected condition, it is also possible to further increase the planar compression in the sealing area by applying a control voltage in an opposite direction.

With the third system, according to the second alternative solution, the diaphragm has its border mounted on the support area projecting from the diaphragm. The diaphragm is then fixed on the support area at a spacing from the substrate so that a cavity is formed between the diaphragm and the substrate, which has the above-mentioned advantages.

The first and second alternative solutions are advantageously combinable with each other into a microfluid actor system which has a border-sided projecting support area to mount the diaphragm at the border, and a central projecting support area to seal an aperture. The support areas may be equal or different in height to seal the aperture more intensely or at all by deflecting the diaphragm towards the substrate and/or by installing the diaphragm at a bias and to release the aperture by deflecting the diaphragm away from the substrate.

According to advantageous aspects, the projecting support area is a surface structure which is integrally joined to the substrate or is deposited onto the substrate.

According to an aspect, the substrate is made of a ceramic material, e.g. alumina ($Al_2O_3$), a glass (e.g. borosilicate glass), quartz ($SiO_2$), a semiconductor (e.g. silicon) or a stiff plastic (e.g. LCP). Since significant forces exceeding 10 N may occur when the fluid actor system is designed as a microvalve or micro-diaphragm pump the substrate preferably is relatively rigid as compared to the micro-diaphragm. According to an aspect, the substrate has a temperature coefficient of expansion which is equal or similar to the temperature coefficient of expansion of the diaphragm to make the microfluid actor system operate as independently as possible of temperatures.

The operation and the working accuracy of the microfluid actor system considerably depend on the dimensional accuracy of the structures.

According to an aspect, the substrate is an injection-molded ceramic component. It may include, in particular, a support area and/or trough as a depression and/or an integrally joined projecting surface structure. Injection-molded ceramic components can be manufactured at very close tolerances.

According to an aspect, the substrate is a planar ceramic standard component employed in the thick-film technique which is manufactured, in particular, in a very good surface finish with very close tolerances at a low cost. In addition, these ceramic substrates have a temperature-resistant stiffness for the subsequent firing processes.

According to an aspect, the substrate has at least one surface structure applied by a thick-film technique. The thick-layer or thick-film technique is mainly employed to manufacture simple, compact electronic circuits or hybrid circuits. The silk-screen printing process is used to apply and fire printed conductors, resistors or other structures to/onto a ceramic chip serving as a carrier, in films ranging between 10 and 50 µm in thickness from pasty mixtures of an organic binder with conducting or dielectric substances. The invention incorporates applying smaller or larger film thicknesses in one or more films.

Preferably, the foregoing support area is applied to the substrate by the thick-film technique. Preferably, a deposit including the cavity is applied to the substrate by the thick-film technique.

The thick-film technique, if used, allows to apply films in the µm range at a high accuracy and low cost. Advantageously, the film thicknesses in the µm range may be utilized for providing both close-tolerance structures and making electric contacts.

According to an aspect, the surface configuration comprises a stepped surface configuration including circumferential stairsteps which, starting from a lowermost step located below the centre of the micro-diaphragm, ascend towards the border-sided mount. This realizes a trough-shaped cavity. The stairsteps preferably take the shape of the deflected diaphragm. This relief-like configuration of the trough is beneficial, particularly in preparing the trough by the thick-film technique where the stairsteps may be deposited by several steps.

In the third system, the diaphragm has its borderline resiliently mounted on the substrate. The resilient mount makes it easier for the diaphragm to be deflected by allowing the diaphragm to be distorted at the border and/or to contract or expand in the diaphragm plane. This enables a micro-diaphragm valve to achieve intensified planar compression in the sealing area and to increase the volume displacement for a micro-diaphragm pump.

The resilient mount of the diaphragm may be realized, for instance, by means of an epoxy resin or polyurethane adhesive which joins the border of the diaphragm to the side of the substrate. In contrast, for example, a ceramic adhesive or a soldered joint may be used to achieve a relatively rigid mount, particularly if a joint is to be made to a defined support area which is very small.

Generally, it is possible to form a through passage in the area of the border side mount of the diaphragm. According to an aspect, is sealed at its border. All through passages will then extend through the substrate.

According to an aspect which was previously mentioned already, the further diaphragm layer is a further piezoceramic element or element which has a temperature coefficient of expansion similar to that of the electrically controllable piezoceramic system. This also makes it easier for the microfluid actor system to work as independently as possible of temperatures.

According to an aspect, the further piezoceramic element is a further piezoelectrically controllable piezoceramic element. This improves the deflectability of the diaphragm in various directions.

According to a further aspect, the piezoceramic element and/or further piezoceramic element is a passive deflection sensor. This permits to supervise the respective deflection of the diaphragm. An electrically controllable piezoceramic element may be used as a passive deflection sensor if it is not electrically selected, but a sensor voltage is picked off.

An electrically controllable piezoceramic element may be a piezoceramic element which is disposed so as to allow electric contacts to be applied thereto from outside. According to an aspect, the piezoceramic element and/or further piezoceramic element has electric contacts to apply a voltage. The electric contacts are formed, for example, as electrically conductive coatings on the two sides of the piezoceramic element which are parallel to the diaphragm plane.

According to an aspect, the diaphragm layer facing the substrate has a side-ward projection beyond the other diaphragm layer and is mounted on the substrate in the area of the projection. In particular, this facilitates making contact with an electrically controllable piezoceramic element.

Preferably, the diaphragm layers are adhered to each other, preferably across the entire surface of its contact area.

Micro-diaphragms useful for fluid actor systems, which typically are from 10 to 40 mms in diameter and about 0.3 to 1 mm each in piezoceramic element thickness, are offered on the market at low prices (e.g. by the PI Ceramik Company). The deflection centrally measured on the micro-diaphragm is from a few µm to abt. 150 µm with no counterload, depending on thickness and particularly on diameter.

According to an aspect, the substrate has two ducts including apertures disposed below the diaphragm of which one aperture is centrally disposed below the diaphragm, to form at least one 2/2-way diaphragm valve. When the diaphragm closes the central aperture the passage is interrupted between the two ducts and the valve is closed. When the diaphragm releases the central aperture the two ducts can be passed through and the valve is opened. In a normally opened diaphragm valve, the membrane releases the aperture when in a non-deflected condition and bulges out towards it to close it when in deflected condition.

In a normally closed diaphragm valve, the membrane seals the central aperture when in a non-deflected condition, and bulges away from it so as to open the valve when in deflected condition.

Preferably, the substrate has a central projecting support area extending around the aperture centrally disposed below the diaphragm to close the aperture particularly tightly. The central support area, which is useful particularly for reasons of particle tolerance and surface roughness, is applied to a ceramic substrate by a thick-film technique, for example, or is formed at an injection-molded ceramic component. According to an aspect, the sealing diaphragm has a resilient silicone layer which improves its sealing characteristic.

According to a further aspect, the diaphragm has a central passage with an aperture on the side facing the substrate and another aperture on the side facing away from the substrate and there is a lid spanning the diaphragm which has a centralized sealing seat for the diaphragm aperture facing away from the diaphragm to form a 3/2-way micro-diaphragm valve. When the diaphragm bears on the sealing seat of the lid the passage through the aperture of the diaphragm is closed. The path through the ducts of the substrate will then be open. When the diaphragm bears on the substrate aperture centrally located underneath the duct with the decentralized opening is closed and the flow path between the ducts with the central apertures in the substrate and membrane will be open.

Outside the mount of the diaphragm, the substrate or lid preferably has a further duct for communication with the diaphragm aperture facing away from the substrate.

According to an aspect, the substrate has one or two ducts including an aperture disposed below the diaphragm to form a micro-volume positive displacer. A deflection of the diaphragm makes it possible to deliver a fluid through at least one duct.

According to an aspect, the microfluid actor system has a first 2/2-way micro-diaphragm valve, a micro-volume positive displacer in communication therewith, and a second 2/2-way micro-diaphragm valve in communication therewith to realize a micro-diaphragm pump. An electric control of the micro-diaphragm valves and the micro-volume positive displacer allows the micro-diaphragm pump to deliver a fluid in any direction. The micro-diaphragm pump may operate both unidirectionally and bidirectionally.

According to a further aspect, the diaphragms of the first and second micro-valves and that of the micro-volume positive displacer are mounted on the same substrate. According to a further aspect, the diaphragms of the first and second micro-valves are mounted on one side of the substrate and the diaphragm of the micro-volume positive displacer is mounted on the other side of the substrate. According to a further aspect, the micro-volume positive displacer is in communication with the microvalves via passages of the substrate. These aspects facilitate a particularly compact setup.

According to an aspect, the fluid actor system has three 2/2-way micro-diaphragm valves which are connected in a series to form a peristaltic micro-diaphragm pump. The pumping function of the micro-diaphragm pump is ensured by the electric control of the micro-diaphragm valves. The micro-diaphragm pump may operate both unidirectionally and bidirectionally.

According to a further aspect, the diaphragms of the three micro-diaphragm valves are mounted on the same substrate. According to a further aspect, the diaphragms of two micro-diaphragm valves are disposed on one side of the substrate and the diaphragms of one micro-diaphragm valve are disposed on the other side of the substrate. According to a further aspect, the series-connected micro-diaphragm valves are in communication with each other via passages of the substrate. These aspects facilitate a particularly compact design of the peristaltic micro-diaphragm pump.

According to a further aspect, the fluid actor system has one 2/2-way micro-diaphragm valve and one micro-volume positive displacer in communication therewith to form a micro-diaphragm pump. The pumping function of the micro-diaphragm pump is ensured by the electric control of the micro-diaphragm valves. This micro-diaphragm pump may also operate both unidirectionally and bidirectionally.

The direction of delivery of the micro-diaphragm pump may be determined by the design of the flow resistances of the two ducts and the way the micro-diaphragms are controlled. Thus, for example, if there is a relatively small flow resistance in the duct having the decentralized aperture of the 2/2-way micro-diaphragm valve, it is possible to achieve that if the micro-diaphragm valve is open the micro-volume positive displacer effects a suction mainly through the microdiaphragm valve and, if the micro-diaphragm valve is closed, expels the fluid drawn in from the outwardly leading duct at a large flow resistance of the micro-volume positive displacer. An inverse direction of flow is ensured when the diaphragm is inversely controlled wherein the micro-volume positive displacer draws in a fluid when the micro-diaphragm valve is closed and expels it when the micro-diaphragm valve is opened.

Different flow resistances are possible, for example, both because of the geometrical configuration and utilization of a gas-to-liquid phase boundary.

In the latter case, the microfluid actor system remains filled with a gas (e.g. air). It is solely on the side where the flow resistance is large that the duct is filled with and successively emptied of the liquid being delivered.

According to a further aspect, the diaphragms of the micro-diaphragm valve and that of the micro-volume positive displacer are mounted on the same substrate. According to a further aspect, the diaphragms of the micro-diaphragm valve and that of the micro-volume positive displacer are mounted on different sides of the substrate. According to a further aspect, the micro-diaphragm valve and the micro-volume positive displacer are in communication with each other through a passage of the substrate. These aspects facilitate a setup that is particularly compact.

According to an aspect, the micro-diaphragm pump is connected to a pipette tip to receive and deliver a liquid. Advantageously, the micro-diaphragm pump is designed so that the capillary forces of the liquid in the pipette tip prevent fluid from being drawn in through the pipette tip when the micro-volume positive displacer effects a suction with the micro-diaphragm opened.

According to an aspect, the micro-diaphragm pump has at least one sensor, e.g. a pressure and/or temperature sensor, which is employed to determine the pumping and liquid characteristics.

According to a further aspect, the microfluid actor system has a filter to filter out particles from a fluid which can be a gas or a liquid moved by a gas, for example.

According to an aspect, the electrically controllable piezoceramic element is connected to an electric controller. Such controller comprises an electric voltage supply. The deflections of the diaphragm are controlled by controlling the piezoceramic element by means of the controller. According to an aspect, the electric controller has a device for determining the deflection of the diaphragm with the aid of the voltage applied to the electrically controllable piezoceramic element and/or a device for detecting sensor signals.

The inventive microfluid actor system combines inexpensive and well-established technical equipment with a high quality of mechanical manufacture and a possibility of integrating microfluid systems, sensor equipment, membrane actors, and electronic systems on one carrier.

A microfluid actor system, in the sense of this application, is a fluid actor system which may be employed to control or deliver minimal fluid volumes in the microlitre and sub-microlitre ranges (specifically from abt. 50 µl to abt. 1 nanolitre). The feature which is characteristic of the microfluid system is its design in a micro-system technology. Its manufacture in a microsystem technology, in particular, may comprise the use of the following materials: ceramic materials and/or plastic materials and/or glass and/or metals and/or semiconductors. These are shaped and worked on by means of appropriate manufacturing processes of a microsystem technology or micro-structuring technology, e.g. injection molding, lapping, thick-film technique (for ceramics) or the LIGA process (for metals, plastics, and ceramics) or lithographic and etching processes (for semiconductors). The feature which is characteristic of the microfluid actor system is that there are extremely small structures, specifically those ranging from 1 to 500 µm).

The microfluid actor system is particularly suited for use as a micro-diaphragm valve and/or micro-volume positive displacer. It may be employed, in particular, as an air pressure driving unit in proportioning liquids in the microlitre and sub-microlitre ranges. According to an aspect, a microfluidic proportioning device includes at least one fluid actor system. Possible embodiments of the proportioning device are described in EP 1 150 105 A1 which is incorporated here by reference thereto.

BRIEF DESCRIPTION OF THE DRAWINGS

The invention will be described in more detail below with reference to the accompanying drawings of embodiments. In the drawings.

DETAILED DESCRIPTION OF THE PREFERRED EMBODIMENTS

In the following description of various embodiments, like components having the same designation are given like reference numbers with constructional differences being marked by primes.

Figure 1:
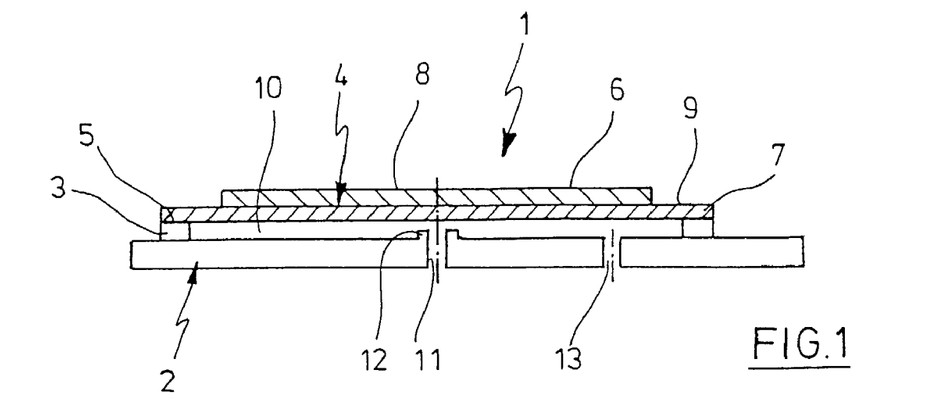
FIG. 1 shows a normally open 2/2-way micro-diaphragm valve with a cavity in a roughly schematic cross-section.

A normally open 2/2-way micro-diaphragm valve 1 of FIG. 1 has a substrate 2 which has a border-sided support area 3 projecting from one side which preferably is of an annular ring shape and to which a diaphragm 4, which preferably is circular, is fixed at 5, preferably by adhering, to the border thereof.

The diaphragm 4 comprises two piezoceramic elements 6, 7 which are adhered to each other on one surface. The piezoceramic element 6 facing away from the substrate 2 has dimensions smaller than those of the piezoceramic element 7 facing the substrate. The piezoceramic element 6 is electrically controllable via an electrically conductive contact surface 8 at the outside and an electrically conductive contact surface 9 at the upper side of the piezoceramic element 7. It is an active piezoceramic element. The piezoceramic element 7 is not electrically controllable and, hence, is passive.

The substrate 2 and the diaphragm 4 have formed therebetween a cavity 10. The cavity 10 is sealed at its border by the support area 3 and the fixing mount 5 which seals the diaphragm 4. The border-sided fixing mount 5 of the diaphragm 4 preferably has a certain resiliency.

Centrally below the diaphragm 4, the substrate 2 has a passage 11 with apertures leading to the cavity 10 and the environment. Further, the substrate 2 has a central upstanding support area 12 which surrounds the aperture of the passage 11 leading to the cavity 10 and is hereinafter called a sealing collar.

Further, the substrate 2 has a passage 13 which is decentralized with respect to the diaphragm 4. The passages may have a diameter of about 0.2 to 1 mm, for example.

When electrically controlled in the same direction, the diaphragm 4 will bulge downwardly. When in a deflected condition, it is seated on the sealing collar 12 and will close the passage 11. As a result, a fluid is prevented from flowing through the passages 11 and 13.

When electronically controlled in an opposite direction the diaphragm 4 will bulge upwardly, thereby increasing the flow rate because of the larger distance.

When in the deflected condition, the diaphragm 4 has a reserve of force and stroke to sealingly resist a positive pressure applied to the passage 11 which corresponds to the differential pressure with respect to the second passage 13. When in the deflected condition, the diaphragm 4 also has a restoring force sufficiently large to release a negative pressure applied. The additional impact of the surrounding atmospheric pressure on the differential-pressure flow characteristics is taken into account in either pressure condition.

Since the stroke is adjustable and there is the gap-like cavity 10 flown through by a fluid control is possible as a proportional valve.

Figure 2:
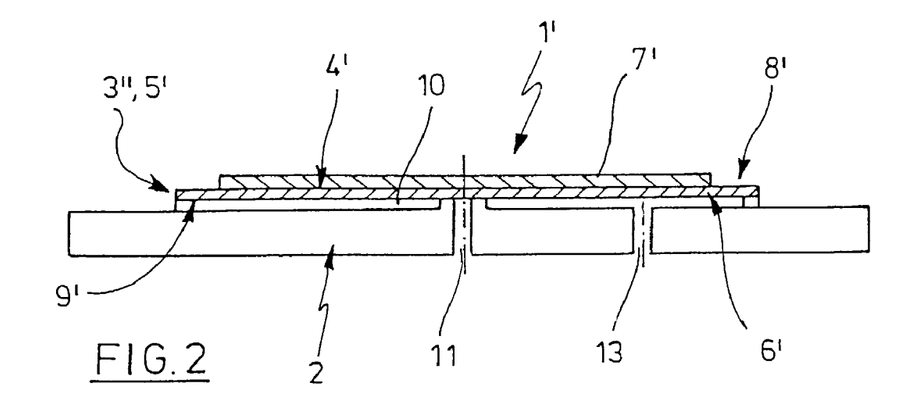
FIG. 2 shows a normally closed 2/2-way micro-diaphragm valve in a roughly schematic cross-section.

According to FIG. 2, a diaphragm 4' having virtually no cavity 10 is fixed at the border at 5', for a normally closed micro-diaphragm valve having a thin support area 3" which projects comparatively little, or directly on the substrate 2. At the same time, the fixing mount 5' is formed as a circumferential sealing which has resilient properties.

The diaphragm 4' has the active, electrically controllable piezoceramic element 6' on the side facing the substrate 2 and has the passive piezoceramic element 7' on the side facing away from the substrate 2. The contact 8' can be accessed in the laterally projecting external area of the piezoceramic element 6' and the contact surface 9' is laterally led out on the substrate 2.

The passages 11, 13 in the substrate 2 correspond to those of FIG. 1.

The micro-diaphragm valve 1' is closed in the initial position shown if it is not controlled. When controlled in an opposite direction, the force applied will completely avoid a certain leakage rate which is only given by a positive fit. When electrically controlled in the same direction, the piezoceramic element 6' allows to bulge the diaphragm 4 away from the substrate 2, which causes the 2/2-way micro-diaphragm valve 1' to open.

Figure 3:
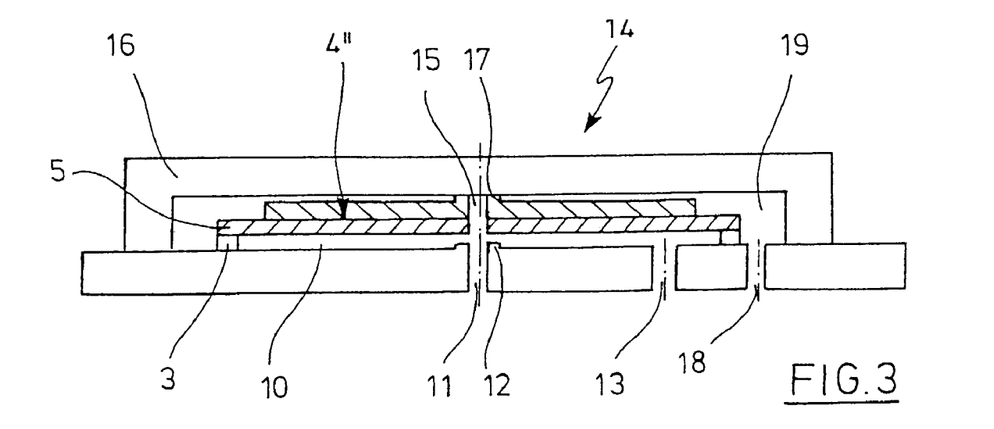
FIG. 3 shows a 3/2-way micro-diaphragm valve in a roughly schematic cross-section.

The 3/2-way micro-diaphragm valve 14 of FIG. 3 differs from the 2/2-way micro-diaphragm valve 1 of FIG. 1 by a central passage 15 of the diaphragm 4". The passage 15 has an aperture leading to the cavity 10 and an aperture on the side facing away from the substrate 2".

Further, the micro-diaphragm valve 14 has the peculiarity of a lid 16 which is put like a cup over the diaphragm 4" onto the substrate 2". At the border of its aperture, the lid 16 is sealingly fixed onto the substrate 2". At its bottom opposite the aperture of the passage 15, it has a sealing seat for the border of the aperture of the passage 15. The lid 16 has a sealing collar 17 there.

In addition, in the distance area between the diaphragm 4" and the lid 16, the substrate 2" has a passage 18 which joins the gap between the diaphragm 4" and the lid 16 to the outside of the substrate 2".

When in a non-deflected condition, the diaphragm 4" seals the sealing seat 17. This blocks the passage 15. Fluid may flow through the passages 11 and 13.

When in a deflected condition, the diaphragm 4" closes the sealing seat 12. This blocks the passage 13 and fluid may flow through the cavity 19 and the passage 18 from the passage 11.

Figure 4:
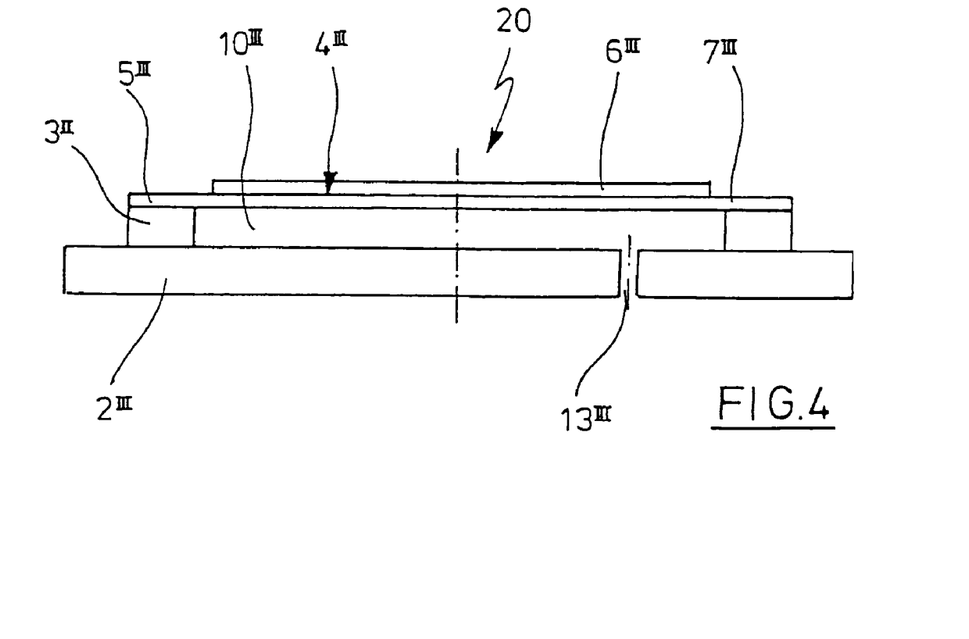
FIG. 4 shows a micro-volume positive displacer in a roughly schematic cross-section.

According to FIG. 4, in contrast to the micro-diaphragm valve 1 of FIG. 1, a micro-volume positive displacer 20 has a diaphragm 4''' which is fixed onto a support area 3" at 5''' at the border at a somewhat larger distance from the substrate 2''' to enable an increased maximal stroke. At least one passage 13 extending through the substrate 2''' which cannot be closed by the diaphragm 4''' makes possible a fluid transfer into or from the cavity 10. The control of this fluid transfer is accomplished by displacement due to the deflection of the diaphragm 4'''.

The border-sided mount 5''' and support of the diaphragm 4''' on 3" is pressure-proof and flexibly rotatable. In case of need, the support area 3" is applied to the substrate 2''' by a thick-film technique.

It is preferred to design the support area 3" as a printed conductor.

In addition, the support of the diaphragm 4''' is mechanically rigid in a direction normal to the diaphragm plane to absorb the generated pressure against the atmospheric pressure. A force of 1 Newton results per cm$^2$ and per 100 mbar. Commercial piezoelectric diaphragms produce positive and negative pressures amounting up to abt. 200 to 400 mbar and displace a volume up to abt. 50 µl. Such diaphragms may be employed here, for example.

Figure 5:
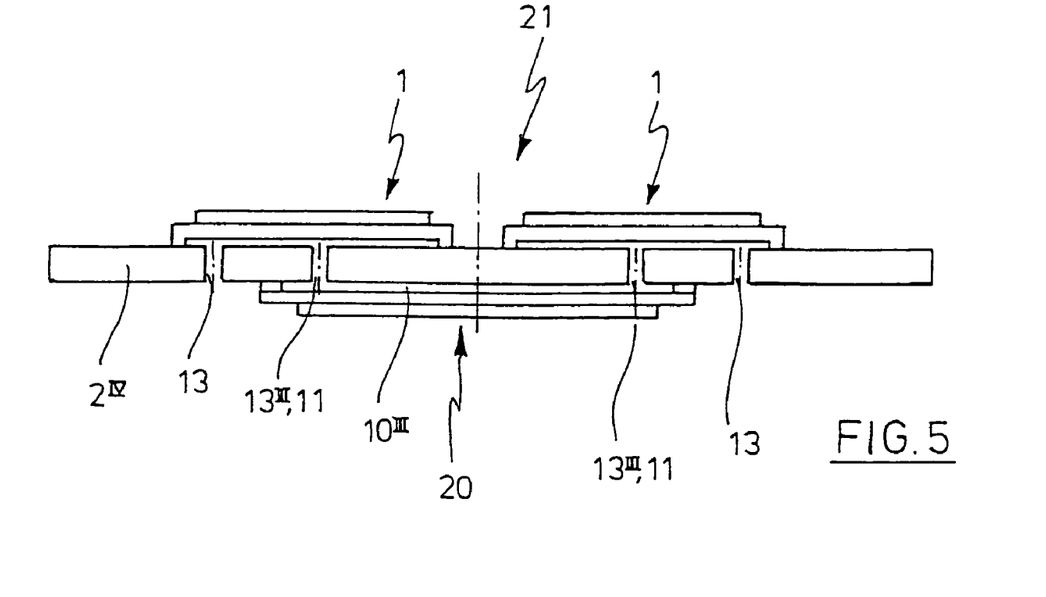
FIG. 5 shows a micro-diaphragm pump having two micro-diaphragm valves and one micro-volume positive displacer in a roughly schematic cross-section.

According to FIG. 5, a micro-diaphragm pump 21 is composed of a combination of two micro-diaphragm valves 1 of FIG. 1 with a micro-volume positive displacer 20 of FIG. 4.

The micro-diaphragm valves 1 are arranged next to each other on one side of the substrate 2$^{IV}$ and the micro-volume positive displacer 20 is disposed on the other side.

The micro-volume positive displacer 20 is in communication with the micro-diaphragm valves 1 via passages 13'''. The passages 13''' are also passages 11 of the micro-diaphragm valves 1.

A fluid may be delivered in any direction by controlling the micro-diaphragm valves 1 and the micro-volume positive displacer 20. In this embodiment, a working stroke is composed of four different partial steps: A micro-diaphragm valve 1 is closed first. The micro-volume positive displacer 20 is controlled in the next step to force the fluid out of the cavity 10''' through the micro-diaphragm valve 1 which is open. The latter micro-diaphragm valve 1 is closed and the micro-diaphragm valve 1 which was closed before is opened, in the next step. Subsequently, the micro-volume positive displacer 20 is controlled to move back to its initial position to draw a fluid into the cavity 10''' through the micro-diaphragm valve 1 which now is open. Afterwards, the procedure described above is repeated any times.

Since the front and rear sides of the substrate 2$^{IV}$ of a ceramic material are utilized a setup can be made which includes little construction space and, thus, little dead space. The larger-diameter diaphragm 4''' of the micro-volume positive displacer 20 encloses the two central passages 11 of the micro-diaphragm valves 1 so that the large compression ratio is capable of producing high positive and negative pressures. The substrate 2$^{IV}$ exclusively has through bores.

Figure 6:
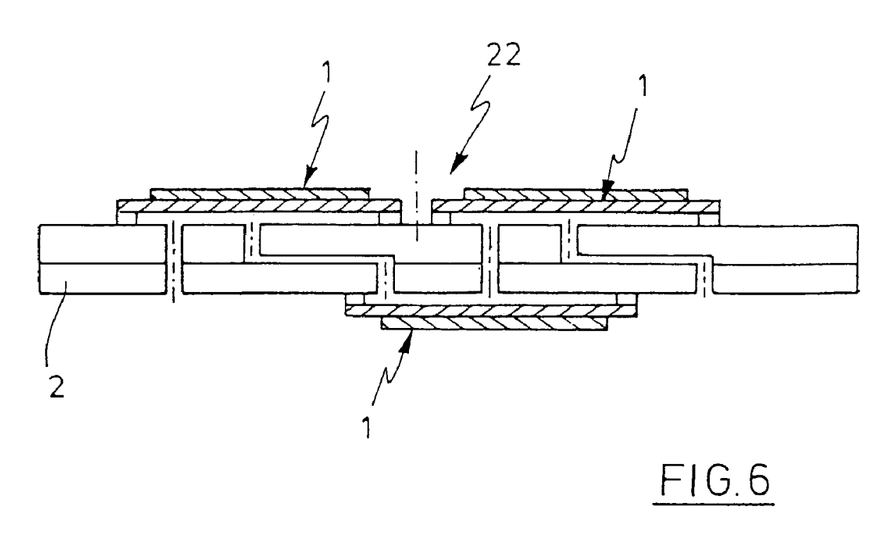
FIG. 6 shows a peristaltic micro-diaphragm pump having three micro-diaphragm valves in a roughly schematic cross-section.

According to FIG. 6, a combination of three active micro-diaphragm valves 1 provides a peristaltic micro-diaphragm pump 22 which bidirectionally delivers fluids in any number of working strokes depending on the control of the diaphragms 4 in time. In this embodiment, a working stroke is composed of three different partial steps. The micro-diaphragm valves 1 prevent the pumped medium from flowing back.

Figure 7:
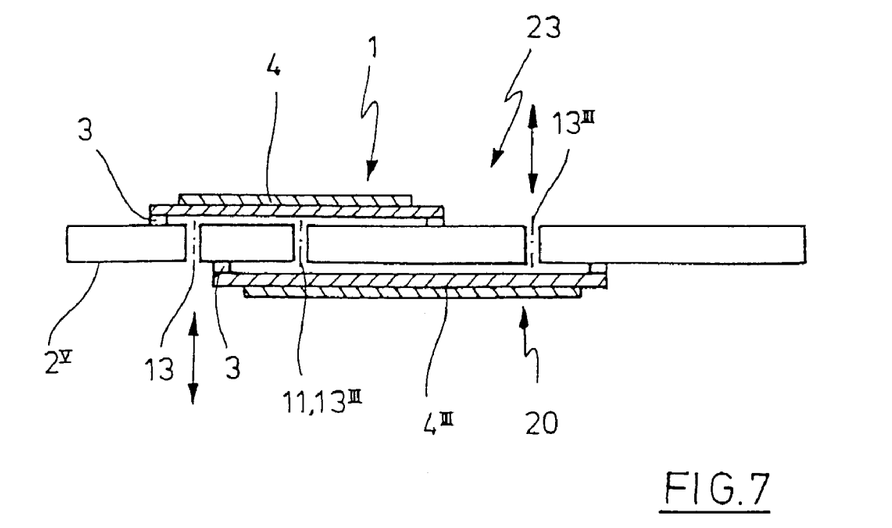
FIG. 7 shows a micro-diaphragm pump having one micro-diaphragm valve and a micro-volume positive displacer in a roughly schematic cross-section.
Figure 8:
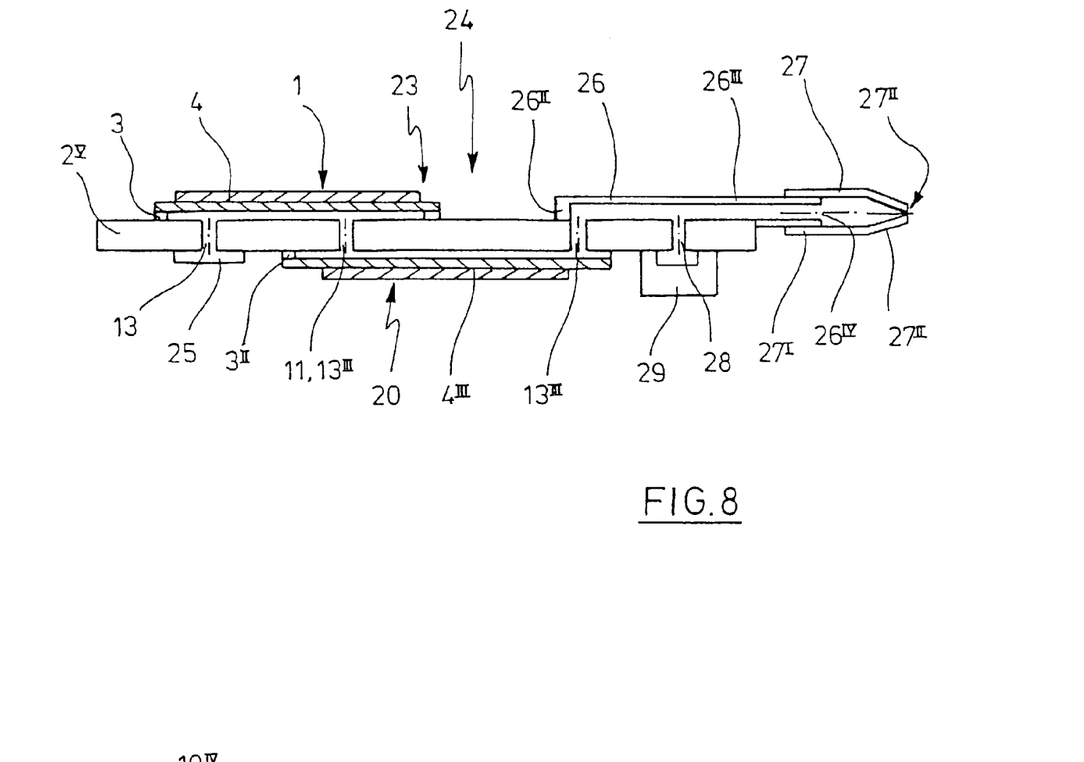
FIG. 8 shows a micro-diaphragm pump having a pressure sensor and a pipette tip in a roughly schematic cross-section.
Figure 9:
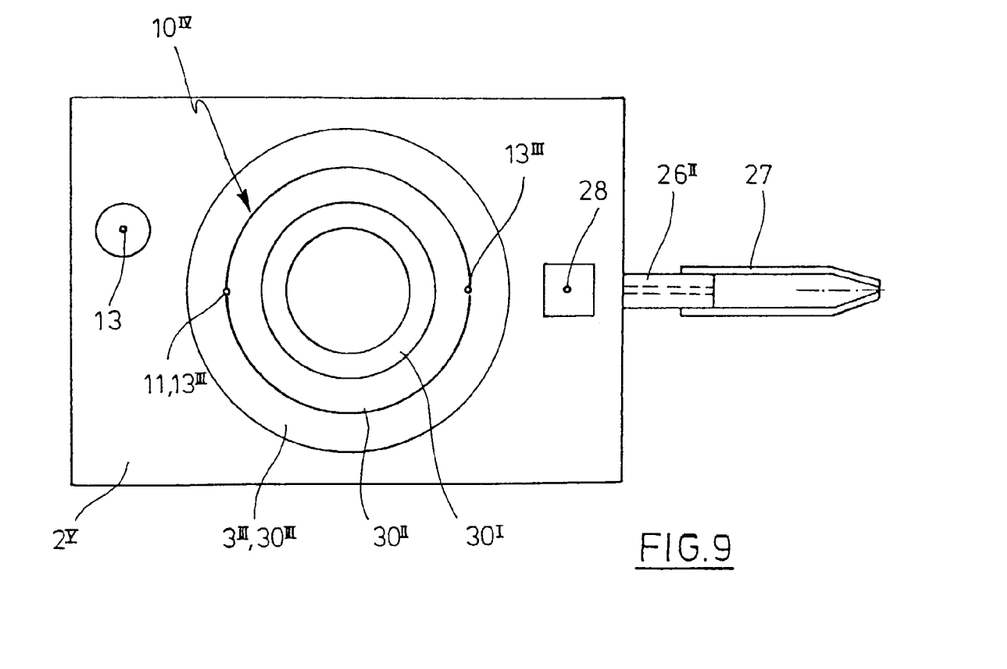
FIG. 9 shows a substrate having a trough applied by a thick-film technique in a top view.
Figure 10:
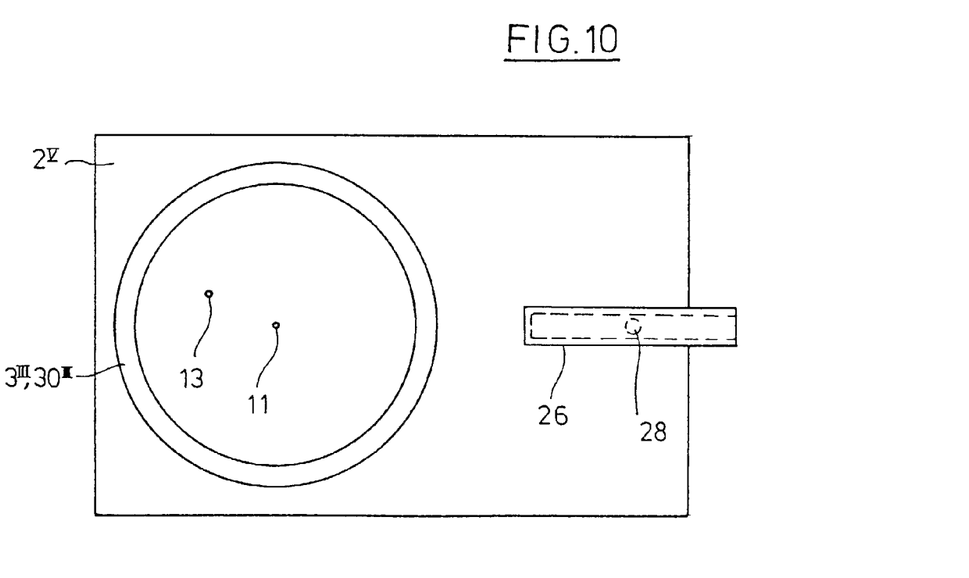
FIG. 10 shows the same substrate in a bottom view.
Figure 11:
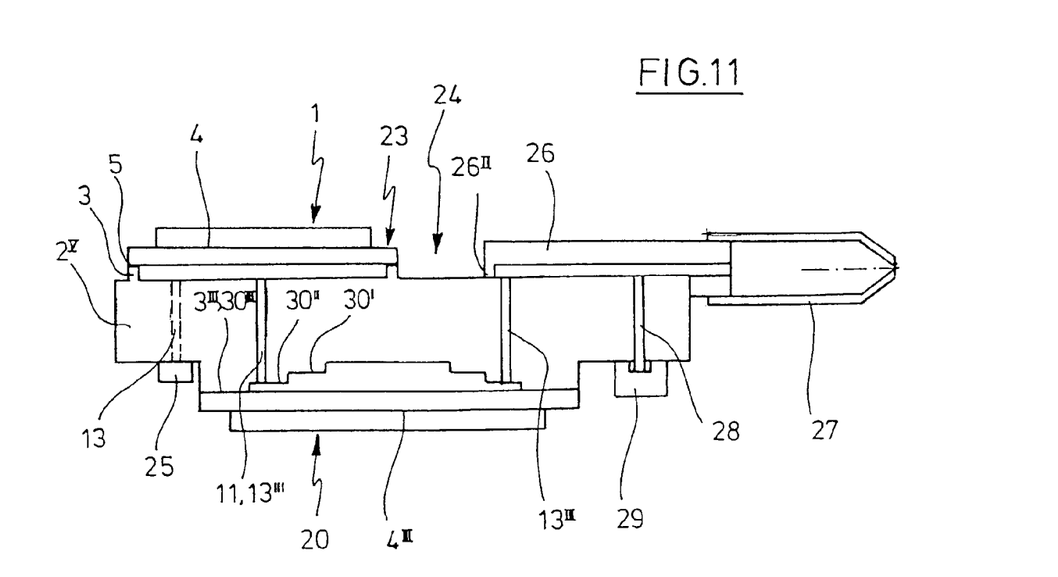
FIG. 11 shows the same substrate as being equipped with diaphragms and a pipette tip placed on top in a roughly schematic cross-section (wherein the substrate is magnified by far more intensely in the transverse direction than in the longitudinal direction).

According to FIG. 6, a micro-diaphragm pump 23 is composed of a combination of one active micro-diaphragm valve 1 with a no-valve micro-volume positive displacer 20 on a substrate 2$^{IV}$. Within a working stroke, the micro-diaphragm pump 23 has a backflow of abt. half the volume displaced if the flow resistances coincide in the passages 13 and 13".

Under certain circumstances, this micro-diaphragm pump 23 makes it possible to pump fluids at a comparatively small backflow, e.g. if the high dynamics in time of the motions of the diaphragms 4, 4''' create different suction and delivery phases. The condition is that there are masses of differing inertias in the fluid passages, capillary forces acting on one side or differing flow resistances.

What is claimed is:

1. A piezoelectrically controllable microfluid actor system, comprising:
    a planar substrate (2);
    at least one cavity (10) provided on at least one side of the substrate (2), the substrate (2) having at least one passage (11, 13) having a first aperture opening into the cavity (10) and a second aperture opening to an opposite another side of the substrate (2);
    at least one diaphragm (4) having a perimeter border and supported above the at least one side of the substrate (2) at a distance therefrom at the perimeter border by support means (3) provided on the at least one side of the substrate (2), the at least one diaphragm (4) and the substrate (2) forming the cavity (10),
    wherein the at least one diaphragm (4) has at least two superposed and interconnected diaphragm layers (6, 7), at least one of the diaphragm layers (6, 7) being formed as an electrically controllable piezoceramic element deflectable into the cavity (10) by an electric drive,
    wherein the substrate (2) has a further passage (11, 13) also having a first aperture opening into the cavity (10) and a second aperture opening to an opposite another side of the substrate (2), of which one of the first and second apertures is disposed centrally below the at least one diaphragm (4) to form a micro-diaphragm valve (1) of at least 2/2 way type.

2. The fluid actor system as claimed in claim 1, wherein the substrate (2) has a central support area (12) projecting from a border of the aperture centrally disposed below at least one the diaphragm (4).

3. The fluid actor system as claimed in claim 1, wherein the at least one diaphragm (4") has a central passage (15) with an aperture on the side facing the substrate (2) and another aperture on a side facing away from the substrate (2) and there is a lid (16) spanning the at least one diaphragm (4") which has a central sealing seat (17) for the diaphragm aperture facing away from the at least one diaphragm (4") to form a 3/2-way micro-diaphragm valve (14).

4. The fluid actor system as claimed in claim 1, wherein the substrate (2) is made of a ceramic material, semiconductor or plastic material.

5. The fluid actor system as claimed in claim 1, wherein the cavity (10) has a stepped surface configuration including a plurality of steps (30', 30", 30''') which, starting from the lowermost step (30'), ascend towards the perimeter border of the at least one diaphragm (4).

6. The fluid actor system as claimed in claim 1, wherein the at least one diaphragm (4) is sealed at its perimeter border.

7. The fluid actor system as claimed in claim 1, wherein the piezoceramic element is a passive deflection sensor.

8. The fluid actor system as claimed in claim 1, wherein the diaphragm layers (6, 7) are adhered to each other.

9. The fluid actor system as claimed in claim 1, wherein the piezoceramic element has electric contacts (8, 9) to apply and/or pick off a voltage.

10. The fluid actor system as claimed in claim 1, wherein the at least one diaphragm (4) is a of a circular disc shape.

11. The fluid actor system as claimed in claim 1, comprising three 2/2-way micro-diaphragm valves (1) which are connected in a series to form a peristaltic micro-diaphragm pump (22).

12. The fluid actor system as claimed in claim 11, wherein the diaphragms (4) of the three micro-diaphragm valves (1) are mounted on the substrate (2).

13. The fluid actor system as claimed in claim 12, wherein two micro-diaphragm valves (1) are disposed on one side of the substrate (2) and one micro-diaphragm valve (1) is disposed on the other side of the substrate (2).

14. The fluid actor system as claimed in claim 13, wherein a series of connected micro-diaphragm valves (1) are in communication with each other via respective passages in the substrate (2).

15. The fluid actor system as claimed in claim 1, comprising one 2/2-way micro-diaphragm valve (4) and one micro-volume positive displacer (20) in communication therewith via respective two passages to form a micro-diaphragm pump (23).

16. The fluid actor system as claimed in claim 15, wherein the diaphragms (4, 4''') of the micro-diaphragm valve (1) and that of the micro-volume positive displacer (20) are mounted on the substrate ($2^v$).

17. The fluid actor system as claimed in claim 16, wherein the diaphragm (4) of the micro-diaphragm valve (1) and the diaphragm (4, 4''') of the micro-volume positive displacer (20) are mounted on the opposite sides of the substrate ($2^v$).

18. The fluid actor system as claimed in claim 17, wherein the micro-diaphragm valve (1) and the micro-volume positive displacer (20) are in communication with each other via a passage (11, 13''') in the substrate ($2^v$).

19. The fluid actor system as claimed in claim 1, including an electric controller connected to the piezoelectrically controllable piezoceramic element.

20. The fluid actor system as claimed in claim 19, wherein the electric controller has a device for determining the deflection of the diaphragm (4) and/or a device for detecting sensor signals.

21. A piezoelectrically controlled microfluid actor system, comprising:
   a planar substrate (2);
   at least one cavity (10) provided on at least one side of the substrate (2), the substrate (2) having at least one passage (11, 13) having a first aperture opening into the cavity (10) and a second aperture opening to an opposite another side of the substrate (2);
   at least one diaphragm (4) having a perimeter border and supported above the at least one side of the substrate (2) at a distance therefrom at the perimeter border by support means (3) provided on the at least one side of the substrate (2), the at least one diaphragm (4) and the substrate (2) forming the cavity (10),
   wherein the at least one diaphragm (4) has at least two superposed and interconnected diaphragm layers (6, 7), at least one of the diaphragm layers (6, 7) being formed as an electrically controllable piezoceramic element deflectable into the cavity (10) by an electric drive, and
   wherein the fluid actor system further comprises a first 2/2-way micro-diaphragm valve (1), a micro-volume positive displacer (20) in communication therewith, and a second 2/2-way micro-diaphragm valve (1) in communication therewith to form a micro-diaphragm pump (23).

22. The fluid actor systems claimed in claim 21, wherein the diaphragms (4, 4''') of the first and second micro-diaphragm valves (1) and that of the micro-volume positive displacer (20) are mounted on the substrate ($2^{IV}$).

23. The fluid actor system as claimed in claim 22, wherein the diaphragms (4) of the first and second microvalves are mounted on one side of the substrate ($2^{IV}$) and the diaphragm (4''') of the micro-volume positive displacer (20) is mounted on the other side of the substrate ($2^{IV}$).

24. The fluid actor system as claimed in claim 23, wherein the substrate has a plurality of passages, and wherein the micro-volume positive displacer (20) is in communication with the micro-diaphragm valves (1) via the respective passage of the substrate.

25. The fluid actor system as claimed in claim 21, wherein the micro-diaphragm pump (23) is connected to a pipette tip (27) to receive and deliver a liquid.

26. The fluid actor system as claimed in claim 21, wherein the micro-diaphragm pump (23) is in communication with at least one sensor (29) and/or at least one filter (25).

* * * * *